(12) United States Patent
Evens

(10) Patent No.: US 10,257,265 B2
(45) Date of Patent: *Apr. 9, 2019

(54) REDUNDANCY NETWORK PROTOCOL SYSTEM

(71) Applicant: Cisco Technology, Inc., San Jose, CA (US)

(72) Inventor: Tim Evens, Seattle, WA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/373,113

(22) Filed: Dec. 8, 2016

(65) Prior Publication Data

US 2017/0093965 A1    Mar. 30, 2017

Related U.S. Application Data

(63) Continuation of application No. 14/029,334, filed on Sep. 17, 2013, now Pat. No. 9,571,603.

(51) Int. Cl.
*G06F 15/16* (2006.01)
*H04L 29/08* (2006.01)
*H04L 29/14* (2006.01)
*H04L 12/24* (2006.01)

(52) U.S. Cl.
CPC .......... *H04L 67/1004* (2013.01); *H04L 41/12* (2013.01); *H04L 67/10* (2013.01); *H04L 67/1034* (2013.01); *H04L 67/30* (2013.01); *H04L 69/40* (2013.01)

(58) Field of Classification Search
USPC ............... 709/221, 204, 228; 370/400, 232; 707/620; 705/3
See application file for complete search history.

(56) References Cited

U.S. PATENT DOCUMENTS

| 5,434,994 A | 7/1995 | Shaheen et al. |
| 5,926,812 A | 7/1999 | Hilsenrath |
| 6,188,698 B1 * | 2/2001 | Galand ............... H04L 12/5693 370/229 |

(Continued)

FOREIGN PATENT DOCUMENTS

| CN | 101491006 A | 7/2009 |
| CN | 101771931 A | 7/2010 |

OTHER PUBLICATIONS

International Search Report, dated Nov. 5, 2014, pp. 1-6, International Patent Application No. PCT/US2014/05325, European Patent Office, Rijswijk, The Netherlands.

(Continued)

*Primary Examiner* — Thanh T Nguyen

(57) ABSTRACT

A redundancy network protocol system may include a server to manage one or more virtual internet protocol address (VIP) profiles. Each VIP profile may be shared across one or more neighboring servers. The neighboring servers may be in the same broadcast domain or distributed to be multiple Layer 3 hops away from one another. The redundancy network protocol system may monitor server health and reachability and further manage the server health and reachability to achieve redundancy. The system may be used to provide high availability to selected applications.

20 Claims, 11 Drawing Sheets

(56) References Cited

U.S. PATENT DOCUMENTS

| | | | |
|---|---|---|---|
| 6,484,145 B1* | 11/2002 | Horne | G06Q 10/06315 379/112.03 |
| 6,597,689 B1* | 7/2003 | Chiu | H04L 12/5601 370/354 |
| 7,134,088 B2* | 11/2006 | Larsen | G09B 9/003 715/765 |
| 7,171,465 B1 | 1/2007 | Endo et al. | |
| 7,729,376 B2* | 6/2010 | Klausberger | H04L 47/10 370/400 |
| 8,818,942 B2* | 8/2014 | Escribano Bullon | G06F 17/30581 707/620 |
| 2001/0038610 A1* | 11/2001 | Decker | H04L 12/6418 370/230 |
| 2003/0121050 A1* | 6/2003 | Kalva | H04N 21/23431 725/97 |
| 2003/0174649 A1 | 9/2003 | Shankar et al. | |
| 2003/0204603 A1* | 10/2003 | Buchanan | H04L 29/06 709/228 |
| 2004/0196790 A1* | 10/2004 | Balakrishnan | H04L 47/10 370/232 |
| 2006/0259607 A1 | 11/2006 | O'Neal et al. | |
| 2007/0174079 A1* | 7/2007 | Kraus | G06Q 10/10 705/3 |
| 2007/0192769 A1 | 8/2007 | Mimura et al. | |
| 2008/0063003 A1 | 3/2008 | O'Neal | |
| 2009/0271655 A1 | 10/2009 | Hotta et al. | |
| 2010/0094950 A1 | 4/2010 | Zuckerman et al. | |
| 2010/0296515 A1 | 11/2010 | Kishi et al. | |
| 2010/0302958 A1 | 12/2010 | Wietfeldt et al. | |
| 2011/0238751 A1* | 9/2011 | Belimpasakis | G06F 3/011 709/204 |
| 2012/0066371 A1* | 3/2012 | Patel | H04L 67/1031 709/224 |
| 2012/0150763 A1* | 6/2012 | Andino, Jr. | G06Q 10/10 705/327 |
| 2012/0210416 A1* | 8/2012 | Mihelich | H04L 63/0218 726/11 |
| 2012/0278513 A1* | 11/2012 | Prevost | H04L 67/32 710/39 |
| 2013/0185408 A1 | 7/2013 | Ngo | |
| 2014/0108188 A1* | 4/2014 | Comstock | G06Q 10/06 705/26.5 |
| 2014/0358854 A1* | 12/2014 | Tabenkin | G06F 17/30079 707/620 |
| 2015/0081767 A1 | 3/2015 | Evens | |
| 2015/0244632 A1 | 8/2015 | Katar et al. | |
| 2017/0036771 A1* | 2/2017 | Woodman | B64D 27/26 |
| 2017/0171305 A1* | 6/2017 | Jones | H04L 47/125 |
| 2017/0193008 A1* | 7/2017 | Kreft | G01C 3/08 |

OTHER PUBLICATIONS

International Search Report and Written Opinion in counterpart International Application No. PCT/US2014/053256, dated Jan. 12, 2015, 14 pages.

"First Hop Redundancy Protocols," p. 1, Wikipedia, http://en.wikipedia.org/wiki/First_Hop_Redundancy_Protocols, p. 1 last modified on May 29, 2013.

"The Linux-HA User's Guide," 99. 1-44, http://linux-ha.org/doc/users-guide/users-guide.html, revision 0.9.3 Dec. 13, 2010 Copyright 2009 and 2010.

English translation of Office Action and Search Report in corresponding Chinese Application No. 201480024916.9, dated Feb. 2, 2018, 10 pgs.

* cited by examiner

| 410 Version |
|---|
| 420 Priority |
| 430 Interval |
| 440 Preemption Value |
| 450 Active Status |
| 460 Neighbor Count |
| 470 Authentication String |
| 480 Virtual Address |
| 485 Source Address |
| 495 Subgroup Identifier |

REDUNDANCY NETWORK PROTOCOL SYSTEM

CROSS REFERENCE TO RELATED APPLICATIONS

This application is a continuation of U.S. patent application Ser. No. 14/029,334, filed Sep. 17, 2013, entitled "Redundancy Network Protocol System," the entire contents of which are hereby incorporated by reference.

TECHNICAL FIELD

The present disclosure relates to server clusters and more specifically, to maintaining virtual internet protocol address (VIP) profiles among servers of the server clusters.

BACKGROUND

High availability clusters are groups of computers, typically servers, which support server applications that can be reliably utilized with a minimum of down-time. High availability within an application space is also to ensure that an application service remains available even after a failure, such as hardware, software, or otherwise. For example, applications that implement communication over internet protocol (IP) over a cluster may redirect IP traffic to an alternate server in the cluster in an event a primary server in the cluster cannot process or handle the requests. Other examples of applications benefiting from high availability include database applications, financial applications, web sites, and back-to-back user agents (B2BUA) among various others.

BRIEF DESCRIPTION OF THE DRAWINGS

FIG. 4 is an example of a keepalive message.

DESCRIPTION OF EXAMPLE EMBODIMENTS

Overview

Figure 1:
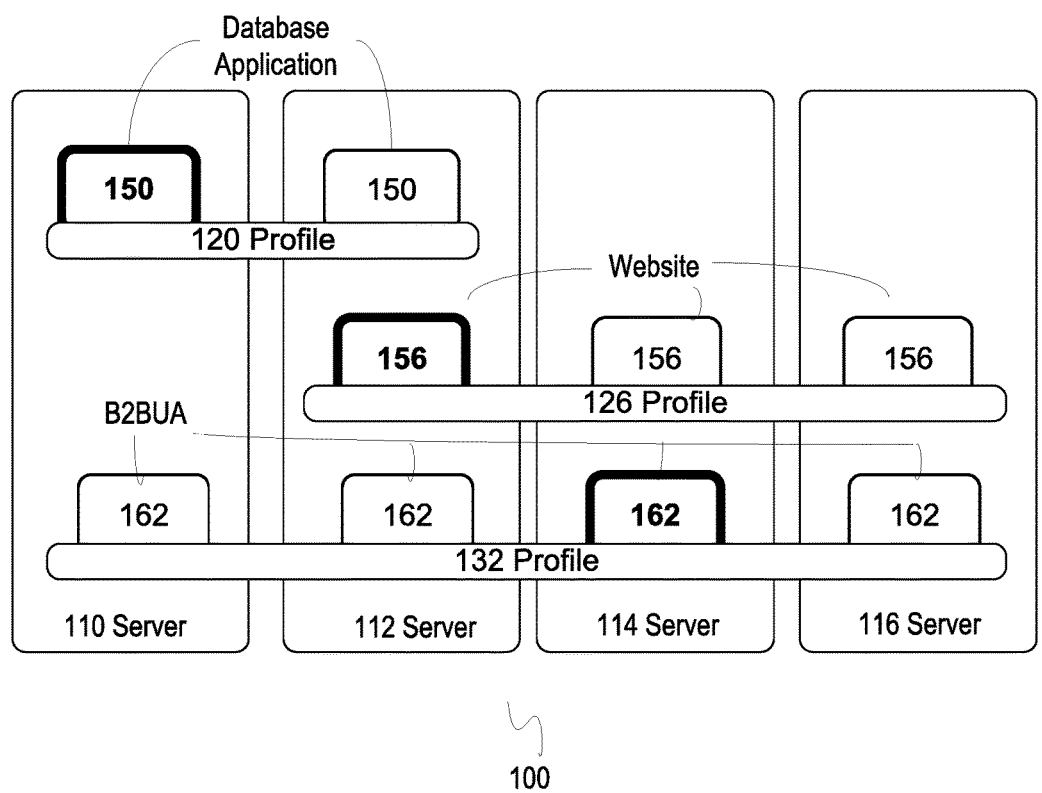
FIG. 1 is a block diagram of an example server cluster.

By way of introduction, the example embodiments described below include a device and method to monitor component health and reachability and further to manage component health, reachability and server application redundancy. The device and method may be used to provide high availability to selected applications.

According to a first aspect, a server may maintain VIP profile corresponding to an application. The VIP profile may be shared between the server and a neighboring server, which is at least one router hop away from the server. The server may be configured to determine a first priority associated with the server and a second priority associated with the neighboring server and compare the first priority and the second priority. The server may be further configured to select the neighboring server as an active server of the VIP profile based on the second priority being greater than the first priority. The active server may be the server that handles a client request directed to the VIP profile In a second aspect, a method at a first server may include monitoring receipt of a status message at a predetermined socket address and identifying a second server based on the status message, such that the second server is one or more router network hops away from the first server and the first server and the second server may be participating in a VIP profile cluster. The method may further include comparing a first priority associated with the first server and a second priority associated with the second server. The second priority may be extracted from the status message. Based on comparing the priorities, and the first priority being greater than the second priority the method may include selecting the first server as an active server of the VIP profile cluster.

In a third aspect, a non-transitory computer readable storage medium is provided where the storage medium includes instructions that may discover neighboring servers located in a broadcast domain by listening for an advertisement message from each of the neighboring servers at a predetermined destination address and add an identity of each of the neighboring servers to a neighbor list in response to a respective advertisement message from each of the neighboring servers, wherein the neighboring servers are one or more router hops away from each other. The instructions may further monitor a reachability value associated with each of the neighboring servers and further monitor a priority value associated with each of the neighboring servers. The instructions may further be directed to selection of an active server of the VIP profile from the neighbor list based on the reachability value and the priority value of, in response to addition of a neighboring server to the neighbor list.

Further aspects and advantages are discussed below in conjunction with the example embodiments.

Example Embodiments

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. Alternatively, or in addition, one or more functional blocks or units may also be implemented in a common circuit, chip, circuit element or unit.

FIG. 1 is a block diagram of an example system 100 including a server cluster. The cluster may share a virtual internet protocol address (VIP) assigned to the cluster. A VIP may be an address, such as an internet protocol (IP) address assigned to multiple applications residing on a single server, multiple domain names, or multiple servers, rather than being assigned to a specific single server or network interface card (NIC). Server applications that implement high availability can benefit from having an address, such as the VIP that is portable between one or more redundant servers. In the event that a server can no longer process or handle a service, the VIP can be assigned to another server of the cluster, allowing for a transparent recovery by further handling of the service by the other server.

The system 100 may include at least a server 110 along with additional servers such as, server 112, server 114, and a server 116. The servers 110, 112, 114, and 116 may also be referred to as nodes. Each server may participate in one or more VIP profiles, such as VIP profile 120, VIP profile 126, and VIP profile 132. Each of the VIP profiles 120, 126, and 132, may be shared across a combination of the servers 110, 112, 114, and 116 with one of the servers being selected as an active server. The system 100 provides each of the VIP profiles 120, 126, and 132 with a unique VIP. For example, the VIP profile 120 may be assigned the VIP 10.1.1.1, the VIP profile 126 may be assigned the VIP 200.1.2.3, and the VIP profile 132 may be assigned the VIP 100.50.50.10.

The VIP profile 120 may be a group of servers, including the server 110 and the server 112, allocated to a server application 150 with the server 110 as the active server. The active server 110 may handle client requests directed to the application 150. The application 150 may implement high availability and benefit from having the group of servers with the VIP. The VIP may be portable among the servers of the VIP profile. In the event that a server can no longer process or handle a request for the application 150, the VIP may be moved to another server, allowing for a transparent recovery by the other server handling the request. The set of servers being shared by a VIP profile may be referred to as a VIP profile cluster. The servers in a VIP profile may also be referred to as neighboring servers of the VIP profile or the VIP profile cluster. Except the active server of the VIP profile cluster, all other neighboring servers may be standby servers and marked INACTIVE for the VIP profile cluster. Such sharing of the VIP profiles may be achieved by using a redundancy network protocol. FIG. 1 depicts the active server of each VIP profile in bold.

The VIP profile 126 may be shared across the servers 112, 114, and 116 with the server 112 as the active server. The VIP profile 126 may correspond to an application 156. As another example, FIG. 1 also illustrates a VIP profile 132 allocated to an application 162 and the VIP profile 132 being shared across the servers 110, 112, 114, and 116 and the server 114 being the active server for the VIP profile 132. Thus, as an example, the server 110 and the server 112 are neighboring servers that share the VIP profile 120 as well as the VIP profile 132.

Each of the applications 150, 156, and 162 may be a database application, a web site, an enterprise-wide application, a load balancing application, or a back-to-back user agent (B2BUA) application, or any application being executed on one or more servers. The VIP profile 120 may be configured so that the application 150 has high availability. This may be achieved by selecting the server 110 as the active server (shown in bold) for the VIP profile 120 which handles requests from the clients directed to the VIP of the VIP profile 120. In response to a failure at the server 110, the VIP profile may select the server 112 as the active server. Further, when the server 110 is functioning again, or if another server is added to the VIP profile 120, the active server for the VIP profile 120 may be reselected from among the servers sharing the VIP profile 120. The active server for the VIP profile 120 may be reselected in response to removal of any of the servers sharing the VIP profile 120 from the VIP profile 120. Alternately, or in addition, the application 150 may be load balanced across the server 110 and the server 112. Load balancing involves distributing client requests across multiple servers by a load balancer. The load balancer may be a separate device. Alternately, the load balancer may be an application corresponding to another VIP profile, such as VIP profile 126. In the above example, client requests to the application 150 may be distributed to the servers 110 and the server 112 that share the VIP profile 120. The load balancer may balance the load across the VIP profile 120 based on the configuration of the load balancer. The load balancer may determine if the cluster of servers in the VIP profile 120 is functioning without any errors by querying the active server for overall cluster health. The load balancer may be access and use information provided by neighbor discovery performed by the VIP profile 120 as a way to auto provision the neighboring servers of the VIP profile 120 for load balancing. Additionally, in response to the auto provisioning by the load balancer, the neighboring servers of the VIP profile 120 may benefit from singleton election and control by maintaining an instance of a session of the application 150 across each of the neighboring servers of the VIP profile 120.

Figure 2:
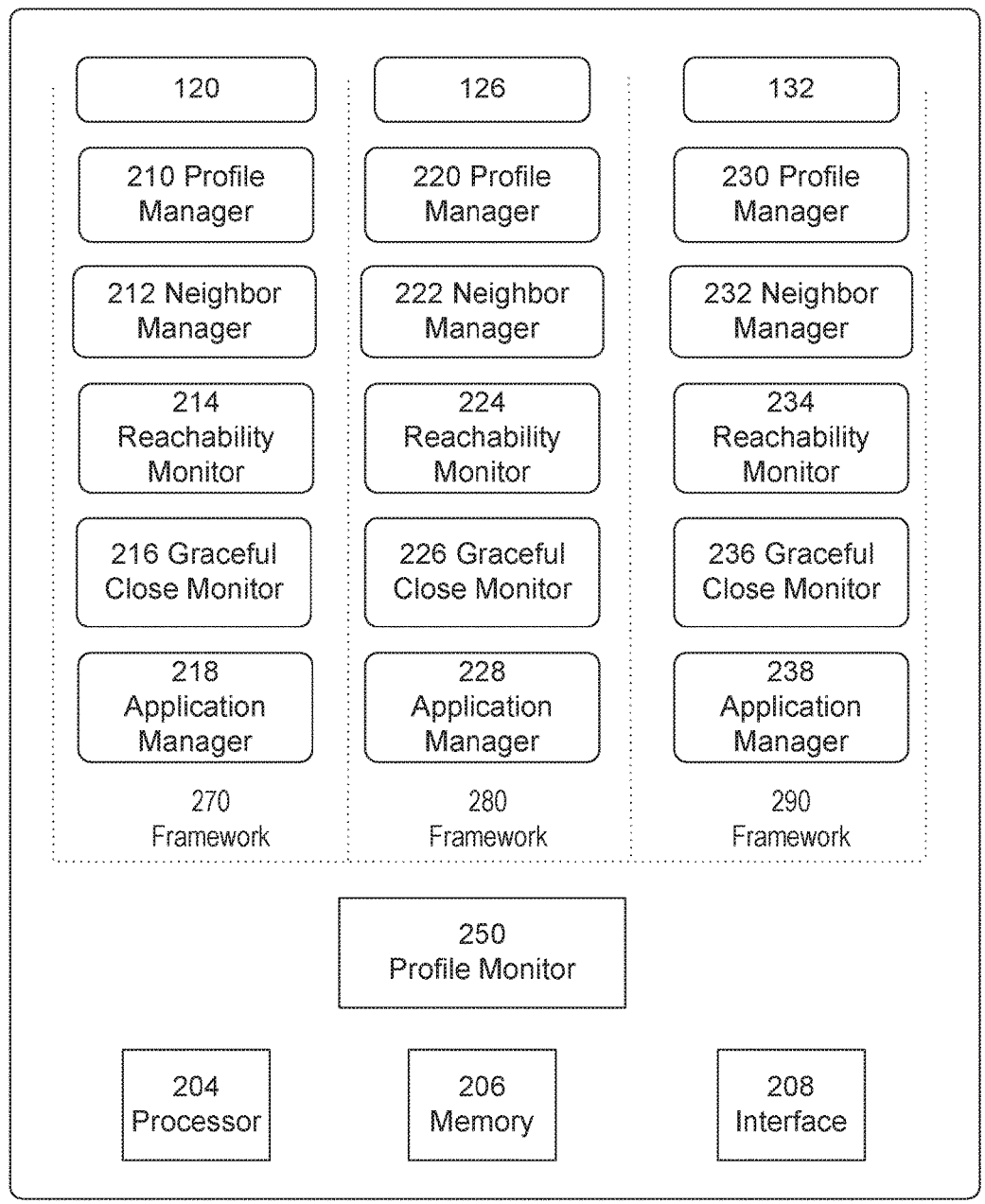
FIG. 2 is a block diagram of an example of a server.

FIG. 2 is a block diagram detailing an example of a server such as the server 112. The server may include at least a processor 204, a memory 206, a network interface card (NIC) 208, and a profile monitor 250. The server may simultaneously participate in more than one of the VIP profiles by being allocated to more than one application. For example, the server 112 participates in the VIP profiles 120, 126, and 132. The server may further include a framework to manage each VIP profile, such as framework 270 corresponding to the VIP profile 120, framework 280 corresponding to the VIP profile 126 and framework 290 corresponding to the VIP profile 132.

The processor 204 may perform tasks of the server 112 and control the operation of the server 112. The processor 204 may work in conjunction with the frameworks 270, 280, and 290 to manage various aspects of the VIP profiles 120, 126, and 132. The memory 206 may include instructions executable by the processor 204. The memory 206 may also store data from the modules of the server 112, such as a neighbor list that contains an identity of each neighboring server in each of the VIP profiles the server 112 participates in. The memory 206 may also contain one neighbor list per VIP profile containing the identity of each neighboring server participating in a corresponding VIP profile. The memory 206 may also contain statistics on messages received from neighboring servers, such as a last time a message was received, number of neighboring servers, and also local statistics regarding state such as transitions from active to inactive server and vice versa, time of last state changed, and tracking object statistics such as execution time, number of successful executions, and causes of failures.

The NIC 208 may enable communication over a network. The NIC 208 may be hardware, such as an embedded component as part of a circuit board, a computer mother board, a router, an expansion card, a printer interface, a USB (universal serial bus) device, or as part of any other hardware. The network may be a packet based network. The network may include a local area network (LAN), a wireless local area network (WLAN), a WI-FI® (a registered trademark of Wireless Ethernet Compatibility Alliance, Inc. of Austin, Tex.) network, a personal area network (PAN), a wide area network (WAN), the Internet, an IP network, any other communications network, or any combination thereof.

The network may utilize any protocol of 3G/4G/EDGE/4G LTE, Bluetooth® (a registered trademark of Bluetooth Sig, Inc. of Kirkland, Wash.), WiMax® (a registered trademark of WiMax Forum of San Diego, Calif.), GPRS, UMTS, HSDPA, HSPA or any other protocol or any combination thereof.

The framework 270 may include modules that manage the VIP profile 120. The framework 270 may include at least a VIP profile manager 210, a neighbor manager 212, a reachability monitor 214, a graceful close monitor 216, and an application manager 218. Each module described herein, such as the VIP profile manager 210, the neighbor manager 212, the reachability monitor 214, the graceful close monitor 216, and the application manager 218, is hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based processing by the module that is initiated directly or indirectly by a processor to complete a process or obtain a result. Alternatively or in addition, each module can include memory hardware, such as at least a portion of a memory, for example, that includes instructions executable with a processor to implement one or more of the features of the module. When any one of the modules includes instructions stored in memory and executable with the processor, the module may or may not include a processor. In some examples, each unit may include only memory storing instructions executable with the processor 204 to implement the features of the corresponding module without the module including any other hardware. Because each module includes at least some hardware, even when the included hardware includes software, each module may be interchangeably referred to as a hardware unit, such as the VIP profile manager hardware unit, the neighbor manager hardware unit, the reachability monitor hardware unit, the graceful close monitor hardware unit, and the application manager hardware unit.

The frameworks 280 and 290 may function similar to the framework 270. The framework 280 may include modules that manage the VIP profile 126, such as a VIP profile manager 220, a neighbor manager 222, a reachability monitor 224, a graceful close monitor 226, and an application manager 228. The framework 290 may include modules that manage the VIP profile 132, such as a VIP profile manager 230, a neighbor manager 232, a reachability monitor 234, a graceful close monitor 236, and an application manager 238. Each of the frameworks 270, 280, and 290 may operate independent of each other since each of the VIP profiles the server 112 participates in are independent of each other. Thus, a failure or other event on the server 112 in regard to the VIP profile 120 does not trigger the VIP profiles 126 and 132 to respond.

Figure 3:
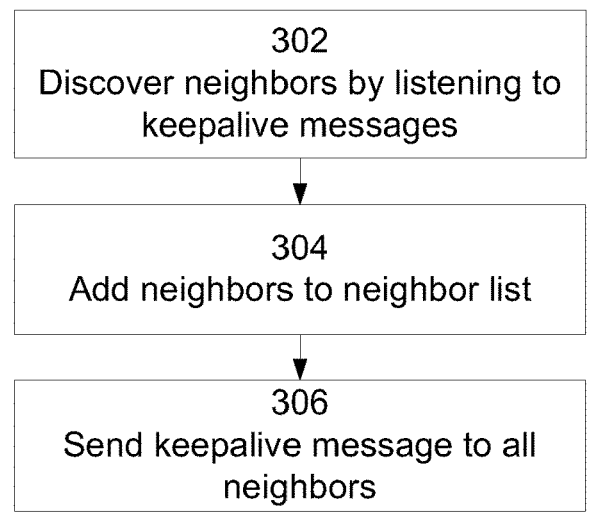
FIG. 3 is a flowchart of steps followed by an example redundancy network protocol system.

The VIP profile manager 210 may manage or administer the VIP profile 120 by performing at least the steps shown in FIG. 3.

At step 302, the neighbor manager 212 may discover all the neighboring servers in the VIP profile 120. Such discovery may involve monitoring for and receiving a periodic status message from the neighboring servers. The periodic status message may also be referred to as a "keepalive" message or an advertisement message. In step 304, based on the discovered neighboring servers, the profile manager 210 may maintain the neighbor list that contains identities of all the neighboring servers in the VIP profile 120. The neighbor list may be a database. The neighbor list may be stored using one or more tables and/or one or more lists. In step 306, the neighbor manager 210 may periodically transmit the keepalive message to the neighboring servers at a predetermined time interval. The predetermined time interval may be synchronized to be consistent among the neighboring servers. The predetermined time interval may be user defined in a configuration file of the VIP profile. A destination address of the keepalive message may be broadcast, multicast, and/or unicast address. The keepalive message may be transmitted and received via user datagram protocol (UDP), or any other communication protocol.

The keepalive message received from a transmitting neighboring server may be encoded, for example, as shown in FIG. 4. The keepalive message contains information regarding at least a version 410, a priority field 420, a keepalive interval 430, a preemption value 440, an active status 450, a neighbor count 460, an authentication string 470, a VIP field 480, a source IP address 485 and a subgroup identifier string 495. The version 410 may indicate a format used by the keepalive message. In other examples, other formats and/or protocols that provide similar information may be used for the keepalive message.

The priority field 420 may indicate a preference, such as a value, of the transmitting neighboring server as the active server of the VIP profile. In an example where values are used to indicate the preference, a higher value may be considered more preferred. A predefined value, such as zero, may indicate that the transmitting neighboring server is in discovery mode, identifying all the neighboring servers. The priority field 420 may have a value within a specified range, such as 0-255. The priority value may be set to a maximum value, indicated by configuration settings, once the discovery mode is completed. In other examples, any other values or data may be used to indicate varying degrees of preference. The priority value may be further updated or adjusted by tracking objects. Each tracking object may have a decrement (or increment) value associated by which the priority value may be modified on execution of the tracking object. The priority value may be incremented on successful execution of the tracking object, and decremented in response to failure of execution of the tracking object. For example, the server may start off with a priority value set to zero while the server is in the discovery stage. On completion of the discovery stage, the priority value may be set to 100 which may be set as the maximum priority value by the configuration settings. During this time the tracking object may begin execution on server startup. Initially the tracking object may be considered in a failed state till indication of a successful execution. If the decrement value associated with the tracking object is 10, the priority value may be set to 90 after discovery completes (100−10=90). Upon a successful execution of the tracking object, the priority value would be restored by the decrement value, thus restoring the priority value to 100. The priority value may never exceed the maximum value indicated by the configuration settings. Similarly, the priority value may never be below a minimum value indicated by the configuration settings. If the execution of the tracking object may lead to the priority value moving beyond either extreme suggested by the configuration settings, the priority value is capped at either the minimum value or the maximum value.

The keepalive interval 430 may be a length of time after which the transmitting neighboring server transmits the periodic keepalive message. The keepalive interval 430 may be an indicator of a period of time, such as, milliseconds. In an example, a value of the keepalive interval 430 may be in a specified range, such as 25-65535 and set to a default value, such as 5 seconds. The neighboring servers of any VIP profile may synchronize the keepalive interval 430 among themselves.

A preemption value 440 indicates whether the transmitting neighboring server performs preemption. The neighboring servers of any VIP profile may synchronize the preemption value 440 among themselves. The active status 450 may indicate whether the transmitting neighboring server is the active server of the VIP profile. Only one neighboring server of any VIP profile may be the active server of that VIP profile. Even in case of the application corresponding to the VIP profile being load balanced, the VIP profile may have one active server which may be the singleton root authority for the neighboring servers of the VIP profile.

The neighbor count 460 may be the number of current neighboring servers of the transmitting neighboring server. Any server may determine the neighbor count 460 based on a number of keepalive messages received by that server. The server with the neighbor count 460 of value zero may indicate that the server is not receiving any keepalive messages, which may indicate an error. Neighbors with the neighbor count 460 of zero may be excluded from a process to select the active server of the VIP profile. The neighbor count 460 may be limited to a predetermined number of neighboring servers, such as 65535.

The authentication string 470 may be any predetermined string of digits, such as a zero padded string, that any of the servers may use to determine that the keepalive message is from one of the neighboring servers of one of the VIP profiles the server is participating in. In an example, the authentication string 470 may be a UTF-7 string of 32 octets. All neighboring servers of the VIP profile may have a similar authentication string 470, and in some examples, the servers of the VIP profile may have the same authentication string 470. The VIP field 480 may provide the address assigned to the VIP profile. The address may be, for example, an IPv4 or an IPv6 address. The VIP field 480 of the keepalive message transmitted by the neighboring servers of the VIP profile may contain the same address. In an example, the VIP field 480 may be a UTF-7 string 46 octets in size.

The source address 485 may provide an address of the NIC of the transmitting neighboring server. In an example, the source address 485 may contain a UTF-7 string 46 octets in size. The source address may be, for example, an IPv4 or IPv6 address.

The subgroup identifier string 495 value may convey a subgrouping within the VIP profile that may differ from one neighboring server to another. The subgroup identifier string 495 may be used by the VIP profile manager 210 to determine a subgroup of the neighboring servers in the VIP profile. The VIP profile manager 210 may perform additional steps when communicating with the neighboring servers in the subgroup. Such additional steps may include real-time replication of application data associated with the application 150 at the neighboring servers in the subgroup. Neighboring servers in a subgroup may also be identified by load balancers as servers among which to balance traffic directed to the active server, in the event that the active server fails or is unable to handle the traffic. In case the subgroup is not identified, the load balancer may default to using other servers in the VIP profile 120. Alternately, the load balancer may identify another subgroup in the VIP profile 120 and determine the neighboring servers to load balance the traffic based on such information. The load balancer may determine which of the above option to take based on a sticky configuration.

Additional fields may be added to the keepalive message such as meta-data, user-defined data and data that may facilitate tracking objects of the neighboring servers. Further, all fields of the keepalive message may have a predefined length. In another example, a field of the keepalive message may be of variable length, the current length value of the field indicated by another field of the keepalive message. If contents of a particular field are not of the predefined length, the contents may be zero padded. Different versions of the keepalive message may have additional or lesser number of fields. Further, a different version of the keepalive message may include and interpret a field in a different way.

The neighbor manager 212 may monitor a predetermined socket or a predetermined port for the keepalive or status message from the neighboring servers of the VIP profile 120, such as the server 110. The neighboring servers may be located on the same broadcast domain as the server 112. The neighboring servers may be zero network hops away. Alternately, or additionally, if the neighboring server 110 is located one or more network hops away, the server 112 may receive the keepalive message from the server 110 as a multicast or a unicast message directed to the IP address of the NIC 208. A network hop may constitute a router or some other Layer 3 network device along a data path from the server 110 to the server 112. A hop count may indicate a number of such intermediate devices encountered along the data path from the server 110 to the server 112. In one example system, the hop count along the data path from the server 110 to the server 112 may be greater than one. Unicast neighboring servers may be detected as being unicast if a receiving socket is bound to unicast. When a neighboring server is detected as unicast, keepalive messages may be automatically forwarded over unicast to the neighboring server which does not require additional configuration. If the keepalive message is received from the neighboring server on a unicast socket, then the neighboring server is considered unicast and therefore a return keepalive message to the neighboring server may be transmitted via unicast. In case, the keepalive message is received as part of a broadcast, the neighboring server may be considered zero network hops away. In such a case, the return keepalive message is transmitted via a predetermined broadcast address. Further yet, if the keepalive message is received as part of a multicast, the neighboring server may be considered zero or more network hops away. In this case, the return keepalive message may be transmitted via a predetermined multicast address.

Figure 5:
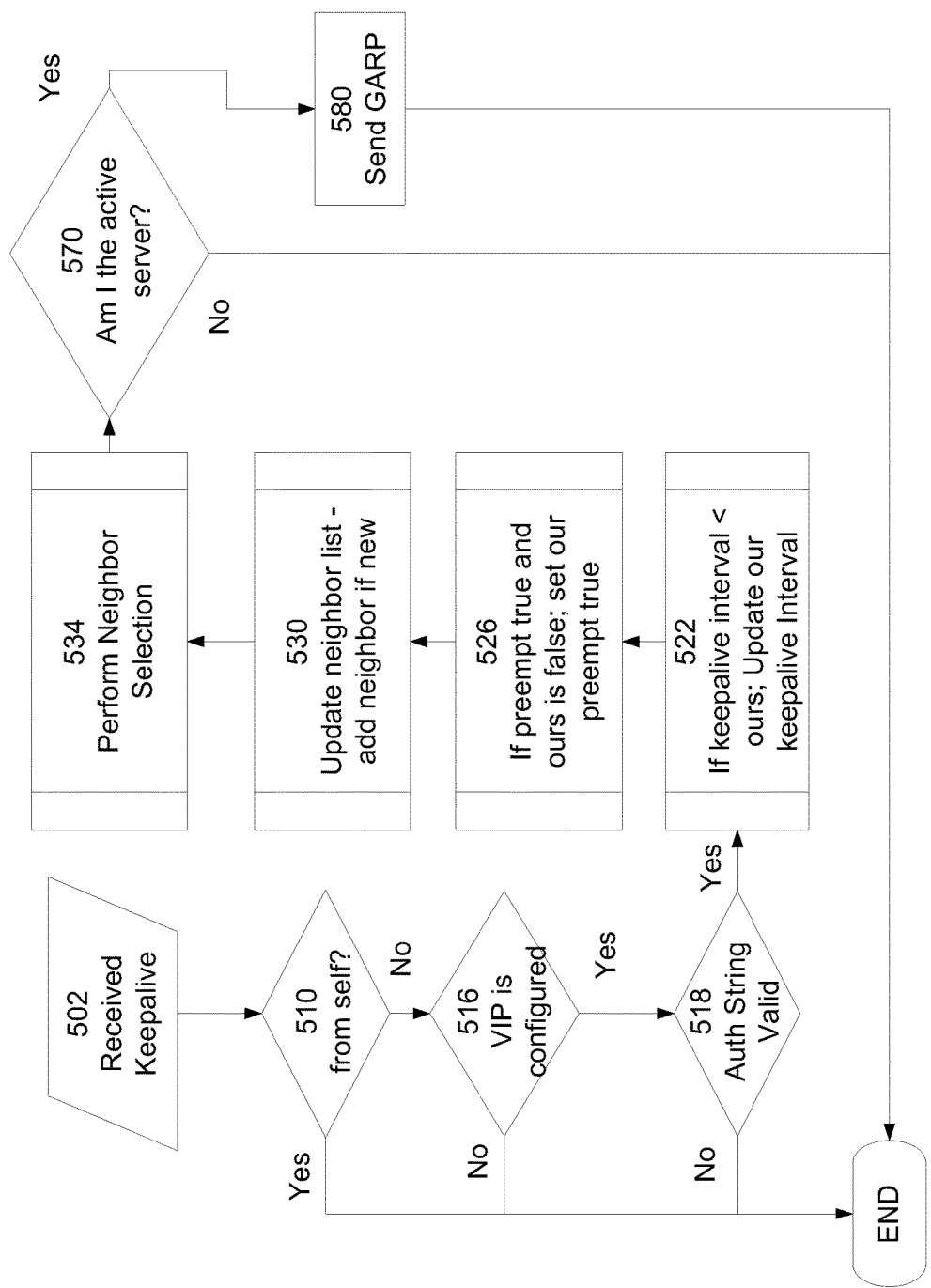
FIG. 5 is a flowchart of steps performed by an example redundancy network protocol system in response to receiving a keepalive message.

In response to receiving the keepalive message from the neighboring servers, in an example, the framework 270, may perform at least the steps shown in FIG. 5. After receiving the keepalive message in step 502, in step 510 the framework determines if the keepalive message received is the one transmitted by the server 112 itself and ignores the keepalive message if it is indeed from self. In step 516 the neighbor manager 212 may determine if the VIP profile 120 has been configured and in a valid state on the server 112. The neighbor manager 212 may ignore the keepalive message if the VIP profile 120 has not been validly configured as enabled. During maintenance, the VIP profile may be disabled instead of being de-configured. This allows for a fast startup of the corresponding application on completion of the maintenance. The neighbor manager 212 may further, in step 518, authenticate the keepalive message based on the authentication string 470 included in the keepalive message.

In step 522 the neighbor manager 212 may synchronize the keepalive interval 430 of the server 110 and the server 112. The neighbor manager 212 may update the period to send the keepalive message to the keepalive interval 430 associated with the server 110, if the latter is smaller. In step 526 the neighbor manager 212 may synchronize the preemption value 440 between the server 110 and the server 112. For example, if the preemption value 440 associated with the server 110 is TRUE and the preemption value 440 associated with the server 112 is FALSE, the preemption value 440 of the server 112 may be updated to TRUE.

In step 530, the neighbor manager 212 may first determine if the server 110 is already identified in the neighbor list corresponding to the VIP profile 120. If this is the first time that the neighbor manager 212 received the keepalive message from the server 110, the neighbor manager 212 may add an identity of the server 110 to the neighbor list. The received information from the keepalive message may be stored under an entry object for the server 110 in the neighbor list. The neighbor list may also hold run-time statistics for the server 110. For example, the neighbor count, a number of keepalive messages received from the server 110, last time a keepalive message was received from the server 110, and the priority of the server 110 may be stored in the entry object of the server 110 in the neighbor list. The neighbor manager 212 may leave the neighbor list unchanged if the server 110 is already identified in the neighbor list. The neighbor manager 212 may update the information stored in the entry object of the server 110 if such updated information is received via the keepalive message. The neighbor manager 212 may also keep track of a number of intervals since the server 110 has sent the keepalive message. When a predetermined number of consecutive intervals are missed, the neighbor manager may remove the identity of the server 110 from the neighbor list of the VIP profile 120 by contacting the VIP profile manager 210.

Figure 6A:
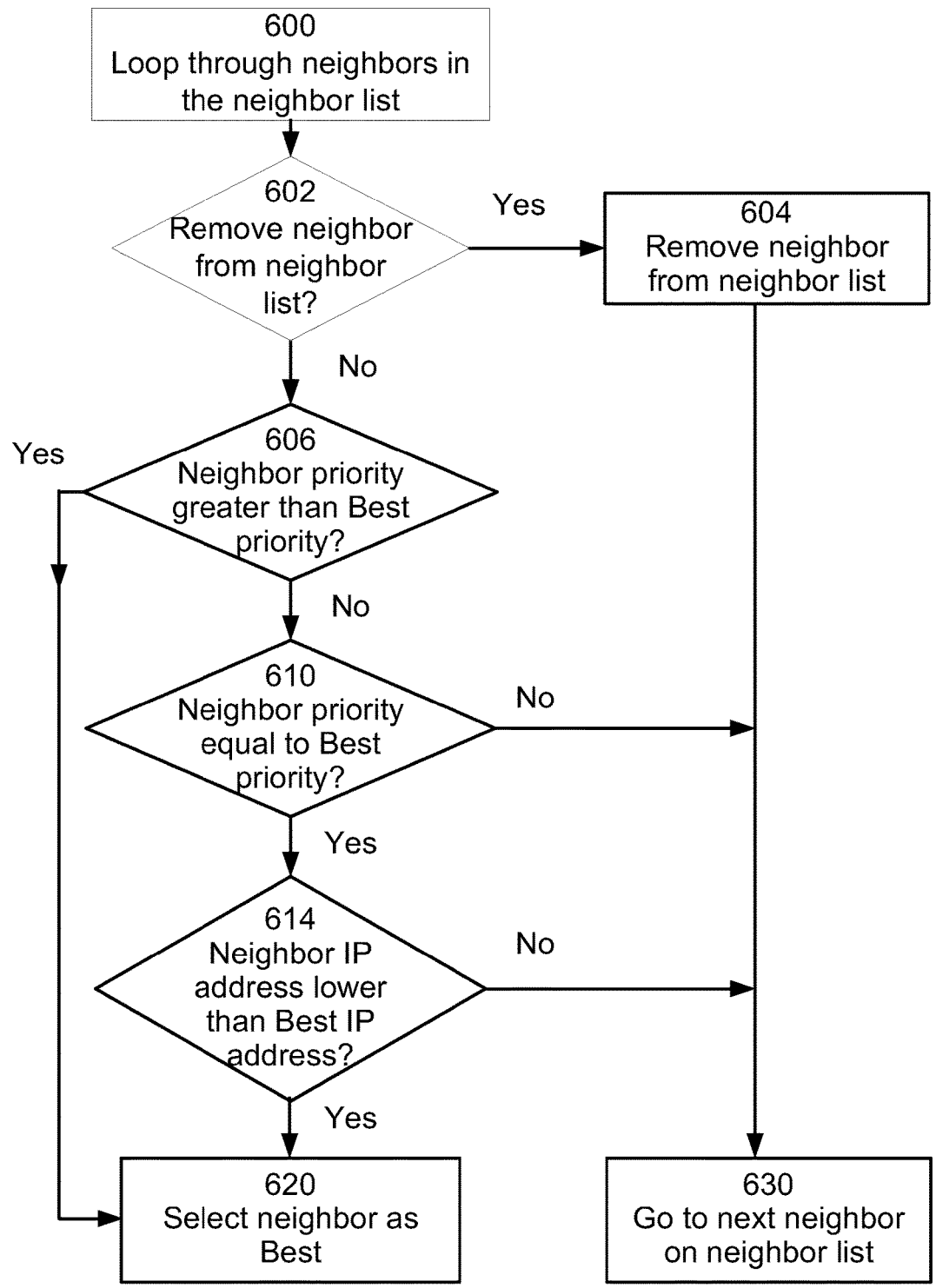
FIG. 6A is a flowchart of steps performed by an example neighbor manager to select an active server of a VIP profile.

Step 534 corresponds to a process of neighbor selection in which the neighbor manager 212 may select the active server for the VIP profile 120 from among those listed in the neighbor list. The neighbor manager 212 may loop through all the neighboring servers listed in the neighbor list to determine a best candidate for the active server. FIG. 6A illustrates an example flowchart of steps involved with a first neighboring server in the neighbor list. Initially the neighbor manager 212 may select any of the neighboring servers on the neighbor list as the best candidate. Step 600 may be initiated in response to receipt of a keepalive message. Alternately, step 600 may be initiated in response to an unsuccessful attempt made to transmit the keepalive message to the first neighboring server. The neighbor manager 212 may maintain a count of attempts made to transmit the keepalive message to the first neighboring server. Every time the neighbor manager 212 receives the keepalive message from the first neighboring server the count corresponding to the first neighboring server may be reset, else a count of attempts to transmit the keepalive message to the first neighboring server is incremented. If the count of attempts to transmit the keepalive message to the first neighboring server has crossed a threshold value, the neighbor manager 212 may determine in 602, to remove the first neighboring server from the neighbor list and move on to a next neighboring server on the neighbor list. Alternately, In 602, the neighbor manager 212 may determine if the first neighboring server should be removed from the neighbor list in response to a neighbor age associated with the first neighboring server. The neighbor age may reflect passage of a number of time intervals since an attempt to transmit the keepalive message to the first neighboring server. The neighbor manager 212 may remove the first neighboring server in response to the neighbor age of the first neighboring sever having crossed a predetermined threshold. In step 606, the neighbor manager 212 may compare a priority of the best candidate (first priority) with a priority of the neighboring server (second priority), obtained from the priority field 420 of the keepalive message received. In step 606, the neighbor manager 212 may determine whether the second priority is greater than the first priority. If that is the case, step 620 may select the neighboring server as the best candidate for active server of the VIP profile 120 based on the second priority being greater than the first priority. If the first priority is greater than the second priority the best candidate does not get changed. Instead, if it is determined in step 610 that the first priority and the second priority are equal, the neighbor manager 212 may further compare, as in step 614, an IP address allocated to the best candidate with the IP address allocated to the neighboring server. The IP address allocated to the neighboring server can be obtained from the source IP address 485 of the keepalive message received from the neighboring server. In step 620, the neighbor manager may select the neighboring server as the active server of the VIP profile 120 if the IP address associated with the neighboring server is lower than the IP address associated with the best candidate. The two IP address values may be compared numerically by comparing at the bit level. The best candidate may remain unchanged if the IP address associated with the best candidate is lower than the IP address associated with the neighboring server. In step 630, the neighbor manager 212 processes the next neighboring server in the neighbor list.

Figure 6B:
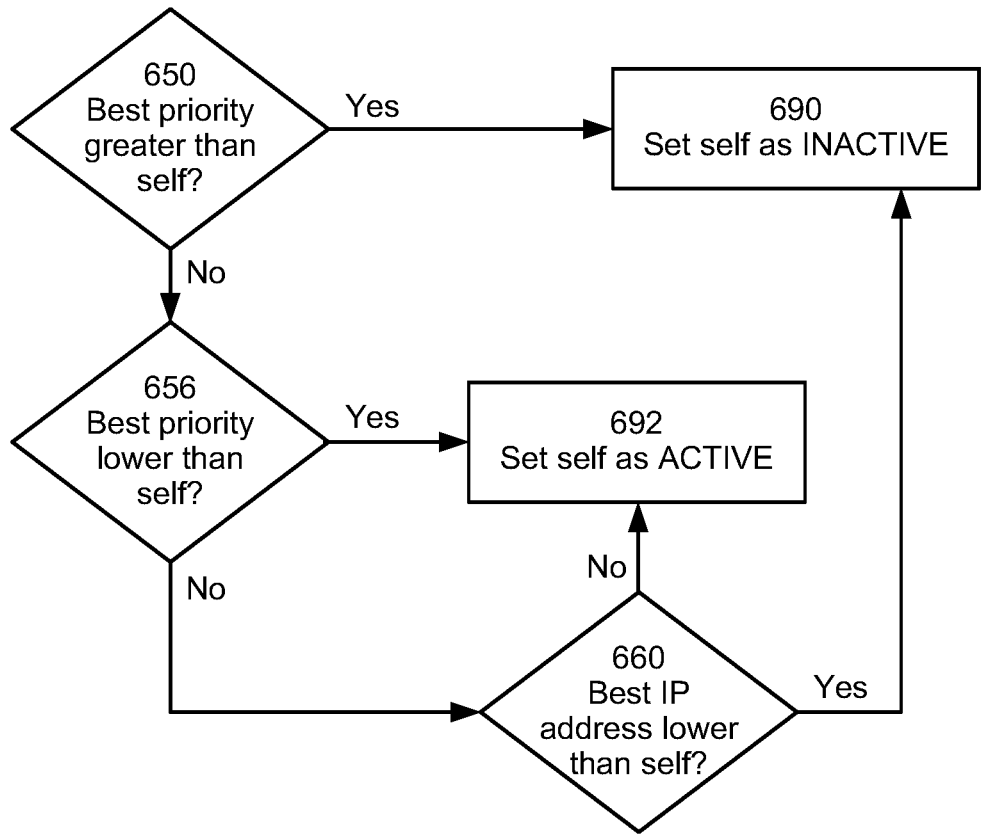
FIG. 6B is a flowchart of steps performed by an example neighbor manager to select an active server of a VIP profile.

FIG. 6B illustrates an example flowchart of steps that may be included in the neighbor selection process after the neighbor manager 212 selects the best candidate for the active server of the VIP profile 120 from the neighbor list. The VIP profile manager 210 may compare the best candidate with the server 112 to determine which among the two should be the active server of the VIP profile 120. If, in step 650, the priority associated with the best candidate is greater than the priority associated with the server 112, the VIP profile manager 210 may set the server 112 as an inactive server for the VIP profile 120 in step 690. If the priority associated with the best candidate is lower than the priority associated with the server 112, the VIP profile manager 210 may set the server 112 as the active server in step 692. Instead, if the two priorities are equal, the IP address associated with the best candidate and the IP address associated with the server 112 may be compared in step 660. If the best candidate has a lower IP address associated, the best candidate may be set as the active server, else the server 112 may be selected as the active server of the VIP profile 120. Each neighboring server of the VIP profile 120 makes the same decision regarding which server will be the active server.

Unidirectional neighboring servers could result in suboptimal neighbor selection or in some cases a selection of the active server that not all neighboring servers are aware of Unicast neighbors may pose increased possibility that neighboring server could be unidirectional in communication. The system 100 may mitigate this issue by decrementing the priority associated with the neighboring server that has a neighbor count different than other neighboring servers. The more the neighboring server has similar neighbor count (equal), the less the decrement value. The neighbor count can also be used to invalidate the neighboring server if the neighboring server has the neighbor count of zero. The priority may be decremented by a decrement value initiated to a user defined value provided in the profile configuration. The decrement value may further be updated based on the difference between the neighbor counts of the neighboring servers and number of the keepalive messages received by the neighboring servers. An example logic to update the decrement value may be—

```
neigh_decrement_value = 0
neigh_with_same_value = 0
FOR EACH neighbor
  DO
    IF my_neighbor_count_for_period NOT EQUAL cur_neighbor_
      count_for_period
    THEN
      neigh_decrement_value += absolute(cur_neighbor_count_for_
                  period - my_neighbor_count_for_period)
    ELSE
      neigh_with_same_value += 1
  DONE
IF neigh_decrement_value NOT EQUAL 0
THEN
  neigh_decrement_value += <user defined value>
  IF neigh_with_same_value GREATER THAN 0
  THEN
    neigh_decrement_value -= int(neigh_decrement_value / neigh_
with_same_value + 1)
    neigh_decrement_value -= neigh_with_same_value + 1
REDUCE my_priority BY absolute(neigh_decrement_value)
```

The following example involving neighboring servers Node 1, Node 2 and Node 3 walks through the above logic. Assume Node 1 and Node 2 have bi-directional communication, but node 3 cannot communicate to nodes 1 and 2, but can receive the keepalive messages from other servers and can communicate via the network. The priority values of the three neighboring servers before execution of the above logic may be—

Node 1—Priority=90 (can see neighbor 2 but not 3)
Node 2—Priority=80 (can see neighbor 1 but not 3)
Node 3—Priority=100 (can see neighbor 1 and 2)

The above logic when executed reduces the priority of node 3. the state of the VIP profile after the execution of the logic would be as follows—

Node 1—neigh_decrement=0 (sees one neighbor with same value)
Node 2—neigh_decrement=0 (sees one neighbor with same value)
Node 3—neigh_decrement=52 (sees two neighbors with abs of 2+user defined 50)

The selection of the active server based on the above steps may result in preemption of the active server during a predetermined event, such as a critical production time. Whether such preemption occurs may be controlled by the preemption setting that is synchronized among the neighboring servers of the VIP profile 120. If the preemption value on all the neighboring servers is disabled the neighbor selection may not select a new active server unless the current active server is first deactivated. With preemption enabled, the neighbor selection selects the new active server based on the steps described earlier. By default the preemption setting may be enabled. Preemption may not desirable during predetermined events, such as the critical production times. The system 100 may control when preemption takes place by maintaining a preemption window. The maintenance window may be a predefined length of time during which the priority of the server cannot be changed. The preemption window may also be referred to as a maintenance window. The maintenance window may be observed periodically. The VIP profile manager 210 may decrement the priority of the server 112 only if following conditions are met:

```
IF not_in_maintenance_window AND transition_counter_incremeneted
THEN
  DECREMENT my_priority BY <user defined value>
ELSE
  SET my_priority TO configured_priority
  SET transition_counter_incremeneted TO 0
```

The VIP profile manager 210 may keep track of a transition counter that indicates a number of times the server 112 may have switched between being the active server and the inactive server of the VIP profile 120. The transition counter may increment when the state changes from ACTIVE to INACTIVE. The maintenance window may not apply if the priority of the server is being updated in response to a failure of the server. The above conditions reduce the priority of the active server only after the VIP profile 120 has had a transition between ACTIVE and INACTIVE during the non-maintenance window period. The user defined value and the configured priority may be obtained from the configuration file of the VIP profile 120.

The server 112 determines in step 570, if the server 112 is selected as the active server of the VIP profile 120, the VIP profile manager, in step 580, may transmit a gratuitous address resolution protocol (GARP) message to all devices on the same subnet as the VIP of the VIP profile 120. The GARP message may advertise a change in MAC address for the VIP to the MAC address of the server 112. If all the neighboring servers in the VIP profile 120 are on the same subnet, they all may update their respective address tables accordingly.

A possible error state may result if two neighboring servers, the servers 110 and 112, falsely believe they each should become the active server for the VIP profile 120. Such a state may be referred to as "split brain." This can result in database corruption and/or data loss. The reachability monitor 214 may prevent a split brain situation. The reachability monitor 214 may ensure that the server 112 is a valid high availability server by monitoring a reachability of the server 112. The monitoring may involve periodically or non-periodically measuring the reachability of the server 112. The reachability may be measured by counting the number of unique network hops for a given set of IP addresses. A user defined min hops value may be used to determine if the server 112 has network visibility to qualify as the valid high availability server. The reachability monitor 214 may record routed network hops using internet control message protocol (ICMP) time to live (TTL). In the case of split-brain, if the reachability of the server 112 is below min Hops, then the server 112 may not be selected as the active server for the VIP profile 120 even if the server 112 is the only server available.

Monitoring the reachability may involve generating packets for each TTL value up to a user defined max TTL. Thus, a max TTL of 10 may imply that 10 packets would be transmitted with TTL in each packet set incrementally. All packets may be transmitted at once in a non-blocking fashion. If min hops is 3, then 3 unique TTL time exceeded messages from network hops may be expected. The network hops may not be sequential in order to meet the minimum. The end-station destination may not be counted. The reachability may be a number of unique network hops encountered or visited in this process. Routing loops may be de-duped and therefore repeated/duplicate responses for different TTL's would be treated as 1 hop. The reachability monitor 214 may coordinate with the profile monitor 250 to disable sending and processing the keepalive messages for ALL VIP profiles the server 112 participate in if the reachability does not meet the min Hops. When the reachability of the server 112 is below the min Hops, the profile monitor 250 may further make the server 112 inactive for all the VIP profiles, 120, 126, and 132, the server 112 participates in. Alternately, every VIP profile may have a setting that may result in the reachability of the server being ignored for the VIP profile.

Figure 7:
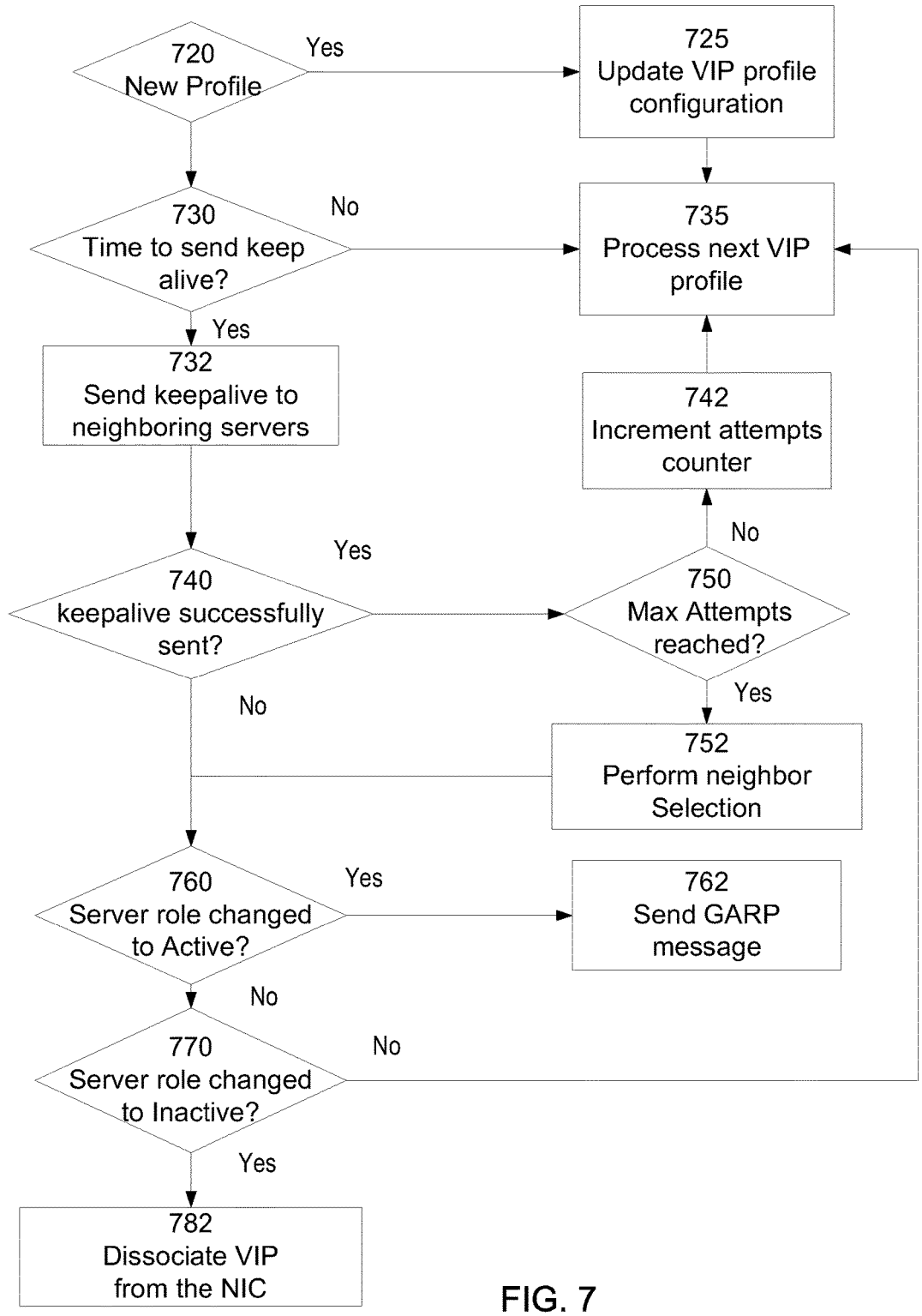
FIG. 7 is a flowchart of steps performed by an example profile monitor.

The profile monitor 250 may be a module that may monitor the VIP profiles the server 112 participates in, the VIP profiles 120, 126, and 132. The profile monitor 250, may periodically cycle through the VIP profiles 120, 126, and 132. FIG. 7 illustrates a flowchart of a sequence of steps that may be followed by the profile monitor 250 for each of the VIP profiles. For instance, when the profile monitor 250 encounters the VIP profile 126, in step 720, the profile monitor 250 determines if the VIP profile 126 is a new VIP profile. If so, configuration information for the VIP profile 126 is updated in step 725. In step 730, the profile monitor 250 determines if it is time to transmit the keepalive message to the neighboring servers of the VIP profile 126. If it is not time to transmit the keepalive message for the encountered VIP profile, the profile monitor 250 returns to the loop to process a next VIP profile in step 735. If it is time to transmit the keepalive message for the VIP profile 126, the profile monitor 250 coordinates with the neighbor manager 222 to transmit the keepalive message to the neighboring servers of the VIP profile 126 in step 732. In step 740, the neighbor manager 222 determines if the keepalive message was sent successfully. The neighbor manager 222 may maintain, in step 742, a number of attempts the neighbor manager 222 has made to transmit the keepalive message to the neighboring servers of the VIP profile 126. After a predefined threshold value of number of unsuccessful attempts to transmit the keepalive message has been crossed in step 750, the neighbor manager 222, in step 752 may select a new active server of the VIP profile 126. In steps 760 and 762, the profile monitor 250 determines if the server 112 was selected as the active server for any of the VIP profiles and if so transmits a GARP advertisement as discussed earlier. Alternately, if in step 770, it is determined that the server 112 was changed to inactive from being the active server for any of the profiles, in step 782, the profile monitor 250 coordinates with the NIC 208 to dissociate the VIP of such a profile from the NIC 208. The server can be the active server for more than one VIP profiles or may not be the active server for any VIP profile.

The profile monitor 250 may also execute action scripts and the tracking objects included in the application manager 228 by coordinating with the application manager 228 whenever the server becomes ACTIVE or INACTIVE for any of the VIP profiles the server 112 is participating in. Action scripts may be used for provisioning the application processes. For example, a database action script may promote and demote a database accordingly. The profile monitor 250 may further execute tracking objects in a continuous loop. The tracking objects may be scripts that result in a pass or a fail. The result may be printed to a standard output associated with the server 112, such as the STDOUT mechanism provided by Linux systems. The tracking objects may be configured to ignore all result strings except a pair of predefined strings or patterns to identify the pass and the fail state respectively. By default a tracking object may start in a fail state. The fail state may be cleared when the tracking object outputs the string corresponding to the pass state. Each tracking object may be assigned a decrement value used to decrement the priority of the server when the tracking object is considered failed.

Figure 8:
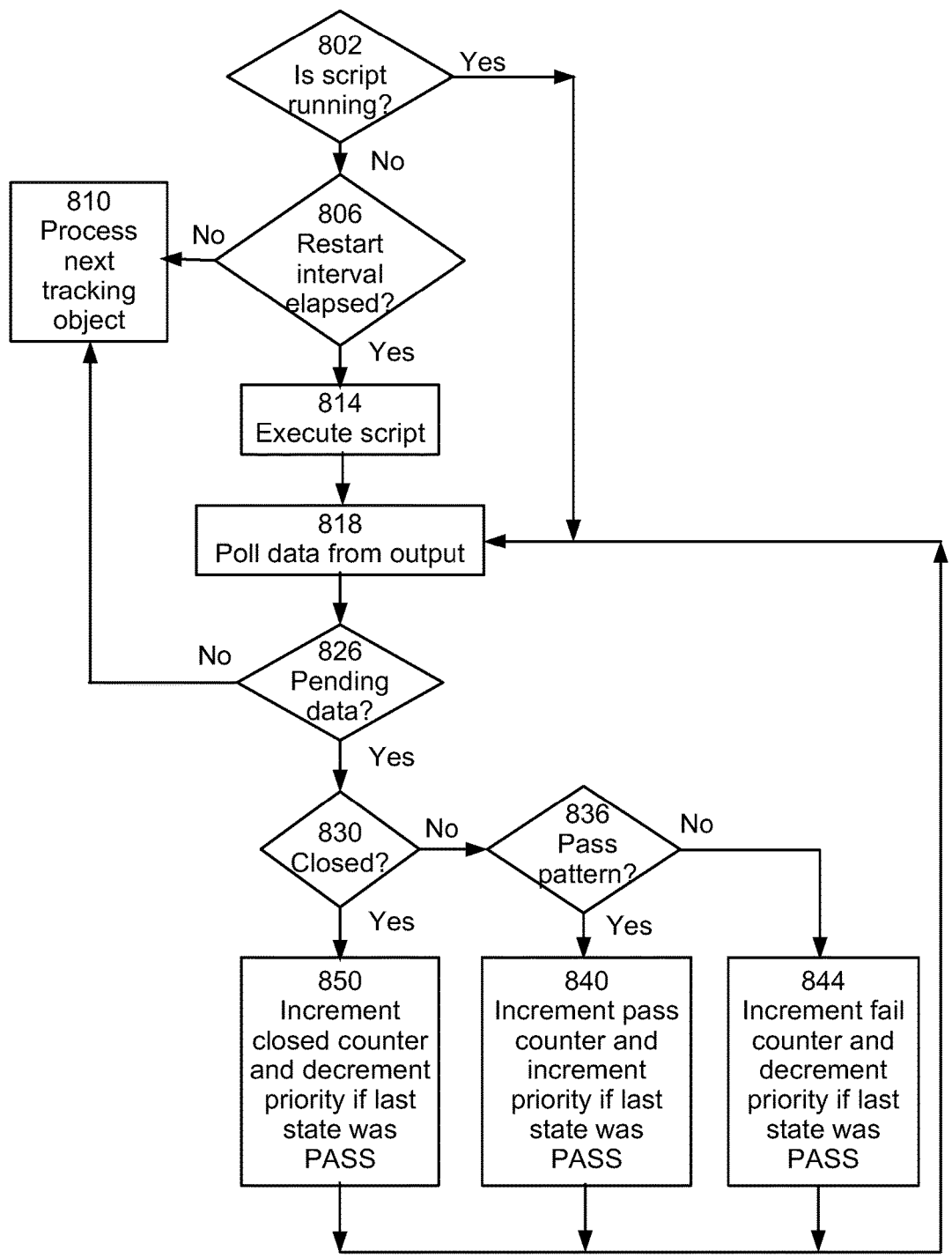
FIG. 8 is a flowchart of steps performed by an example tracking object.

The typical tracking object may go through at least the steps illustrated in the flowchart of FIG. 8. At step 802, the tracking object determines if the script is still running. In steps 806 and 814 the tracking objects may restart the script automatically after a predetermined restart interval of time is elapsed. In case the restart interval has not elapsed, a next tracking object may be processed. The predetermined restart interval may be provided by the configuration file for the VIP profile 120 and may be set to 30 seconds by default. Tracking objects may be event driven instead of being interval based. This allows immediate notification when the tracking object detects a problem without having to wait for the next interval or missed intervals. In step 818, the tracking object may poll data resulting from the execution of the script. If, in step 830, the script closes during the execution, due to an error or any other reason, in step 850, a corresponding closed counter may be incremented and the priority associated with the server 112 may be decremented if the tracking object was in the pass state. If the script corresponding to the tracking object puts the tracking object in a fail state in step 836, the priority associated with the server 112 may be decremented and a fail counter may be incremented in step 844. The tracking object may be marked as failed when the tracking object first starts, if the tracking object terminates, or if the tracking object sends a fail pattern. Subsequent failures do not get subtracted from the priority. Only the first one is subtracted. The tracking object may maintain the pass or fail state to prevent decrementing the priority more than once. When the tracking object writes the pass pattern in step 836, the priority associated with the server is incremented by the decrement value and a pass counter is incremented in step 840. The tracking objects may log any related statistics such as running time, the failure counter, the pass counter and the close counter. The tracking object may log the statistics in a corresponding statistics file. The tracking object may ensure that the corresponding statistics file exists before it executes the corresponding script. In case the corresponding statistics file does not exist, the tracking object may create one. Alternately, the statistics may be stored directly in the memory 206. The statistics may be made available to the action scripts, the tracking objects or administrators via a graphical user interface or a third party application via an application programming interface (API). The API may provide queries to read or write the statistics to the statistics file or to the memory 206. The API may further provide retrieval of status and various metrics associated with the server.

Figure 9:
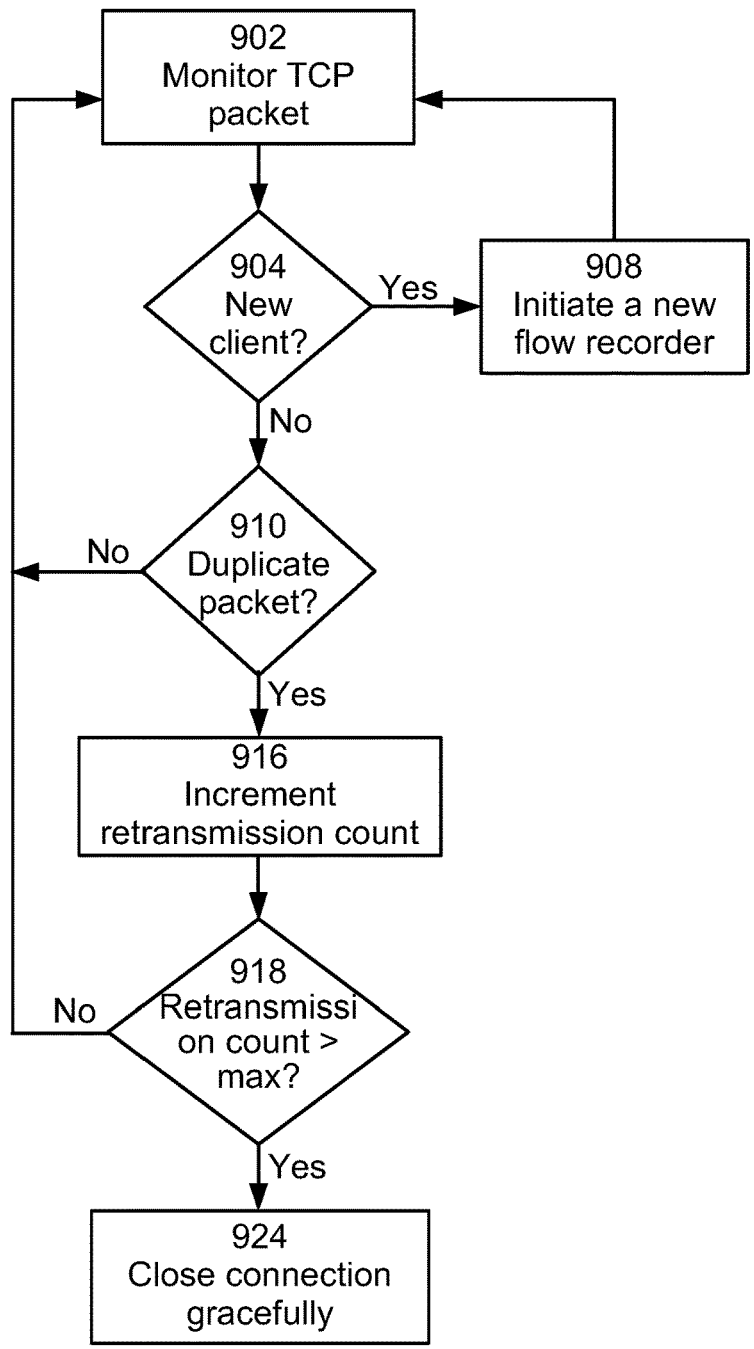
FIG. 9 is a flowchart of steps performed by an example graceful close monitor.

FIG. 9 is a block diagram of example steps that may be followed by the graceful close monitor 216 to gracefully close a TCP connection between the active server and a client accessing the application associated with the VIP profile 120. TCP based applications are known to respond poorly to TCP resets resulting in a page error or a drop in a call at the client side. In the event the active server fails and one of the neighboring servers takes over as the active server, the neighboring server may not have the TCP connection that were established by the earlier active server. In this case, the new active server may send a TCP reset message on the TCP connection, or may ignore the TCP connection which may result in the application to replicate an application session with the client. Further, the client may have to establish a new TCP connection with the new active server.

The system 100 may overcome such issues without having to replicate TCP states such as window sizes, sequence numbers, connections and any other TCP states. The graceful close monitor 216 may implement such a graceful close via a proper TCP FIN/FIN+ACK handshake close. Such graceful closing of the TCP connection, even mid transmission, may report an end of file (EOF) indication to the client application resulting in a retry instead of an error message, such as a server internal error. Applications on the client side may honor this as a normal close, even if abrupt, and simply reconnect to continue. In step 902, the graceful close monitor 216 may monitor TCP packets being directed to the VIP associated with the VIP profile 120. The graceful close monitor 216 maintains a flow recorder for each TCP connection from the VIP to the client. In step 904, the graceful close monitor 216 may determine if a TCP packet is from a new client and whether a corresponding new flow recorder needs to be initiated in step 908. The flow recorder may contain a retransmission count which is a number of times a particular TCP packet has been transmitted to the VIP. In step 914 the graceful close monitor 216 increments the retransmission count in response to a duplicate of the particular TCP packet determined in step 910. Retransmissions may be a sign that the server application is unable to handle the request. This may indicate an application failure or that a socket does not exist. If the retransmission count exceeds a predetermined threshold value in step 918, the graceful close monitor 216 may close the TCP connection to the client in step 924. The VIP profile configuration may provide the predetermined threshold value. The predetermined threshold value may be changed by a user by modifying the configuration file.

Closing the connection gracefully may involve purging the flow recorder. The graceful close may further involve sending an ACK message to the client in response to FIN message from the client. In case a SYN flag is set in the packet from the client, a RST message may be sent to the client with a window size of zero. Else, the graceful close monitor 216 may send a FIN and ACK data to the client. Every time a FIN message is sent the graceful close monitor 216 may increment a corresponding FIN counter. The graceful closing may be performed passively allowing the application to start responding at any time. If the application responds, the graceful close monitor 216 may allow that packet to reach the VIP and withhold doing the graceful close. Further, the graceful close monitor 216 may configure the server 112 to NOT send TCP reset messages, which is the default response for operating systems, such as Linux, when a TCP packet with the ACK flag set arrives and no connection/socket exists. The graceful close monitor 216 may return a RST message instead of a FIN close message if the packet received/monitored has the SYN flag set. Thus, in case of packets that have the ACK flag set, the graceful close monitor 216 may close the corresponding TCP connection using FIN/FIN+ACK.

The graceful close monitor 216 may monitor the TCP packets on a separate thread. The monitoring may also involve monitoring kernel events that indicate opening and/or closing sockets on the server by linking to the kernel events. Monitoring a socket table may not be sufficient and further in case of multiple sockets, may be slow. Therefore, the graceful close monitor 216 may monitor the TCP packets via packet capture interfaces provided by the operating system of the server.

The VIP profile manager 210 may further be configured to advertise the VIP associated with the VIP profile 120. VIP addresses in a broadcast environment may be from a directly connected subnet. This may enable a router to use address resolution protocol (ARP) to discover which host has the active VIP. For same subnet deployments where the VIP and all neighbors are within the same subnet/broadcast domain the VIP profile manager 210 may advertise the change in MAC address for the VIP via a GARP message to all devices on the same subnet. The MAC address may be a virtual MAC address set to a predetermined value.

In a deployment where the VIP is floating between subnets or when there are unicast neighboring servers, the VIP may need to be re-routed to a different router than the subnet the VIP aggregates to. A floating IP address may be assigned to the VIP profile 120 so that the client of the application need not know the IP address of the active server and may direct any requests to the floating IP address. The VIP profile manager 210 may ensure that the client requests to the floating IP address are directed to the server that is currently selected as the active server. Further, in such deployments, next-hop aliasing may be used where routers may need to use a floating static route or dynamically learned route pointing to the directly connected (reachable by ARP preferred) IP address of the active server that should receive the traffic for the floating VIP. The VIP profile manager 210 may associate an extra IP address with the VIP profile 120 to be used as a next-hop address solely for next-hop forwarding. The next-hop address may be from within the subnet as configured on the IP address of the NIC 208. The next-hop address may not accept inbound connections and may not be monitored by the graceful close monitor 216. The next-hop address may filter incoming traffic to allow internet control message protocol (ICMP) to/from the same subnet and block all other data. The next-hop address may be used for tracking the next-hop reachability by the routers. The routers may implement IP service level agreements (SLA) ICMP probes to monitor if the next-hop address is reachable or not. If the next-hop address stops responding, then the router may dynamically remove the route. The floating static route allows the router to move the VIP/32 or VIP/128 route from one router to another as needed. Likewise, the other router that starts to have reachability to the next-hop may start to advertise the route. This enables the network to learn where the VIP is active.

In the deployment scenario where the VIP is not within the same subnet or when there is at least one neighbor that is a unicast neighbor, the VIP profile 210 may also advertise the VIP associated with the VIP profile 120 to the routers using a border gateway protocol (BGP). Further, the profile monitor 250 may dynamically advertise the VIP of the VIP profile for which the server 112 is the active server and to withdraw advertisements of the VIP associated with the VIP profile for which the server 112 is made inactive. Users may modify community policy settings related to the BGP in the configuration file. The profile monitor 250 may perform advertising in compliance with protocols such as BGPv4. In case of BGP, the VIP associated with the VIP profile 120 may be advertised in addition to the static route to the active server. A router may know the IP address of the active server by BGP configuration. The VIP may be advertised via BGP dynamically via the BGP configuration. In the case of next-hop alias, the router may only know about the next-hop alias and the VIP in terms of the advertisement for the VIP and the router may be configured statically with the floating static route for the VIP pointing to the next-hop address of the next-hop-alias.

Figure 10:
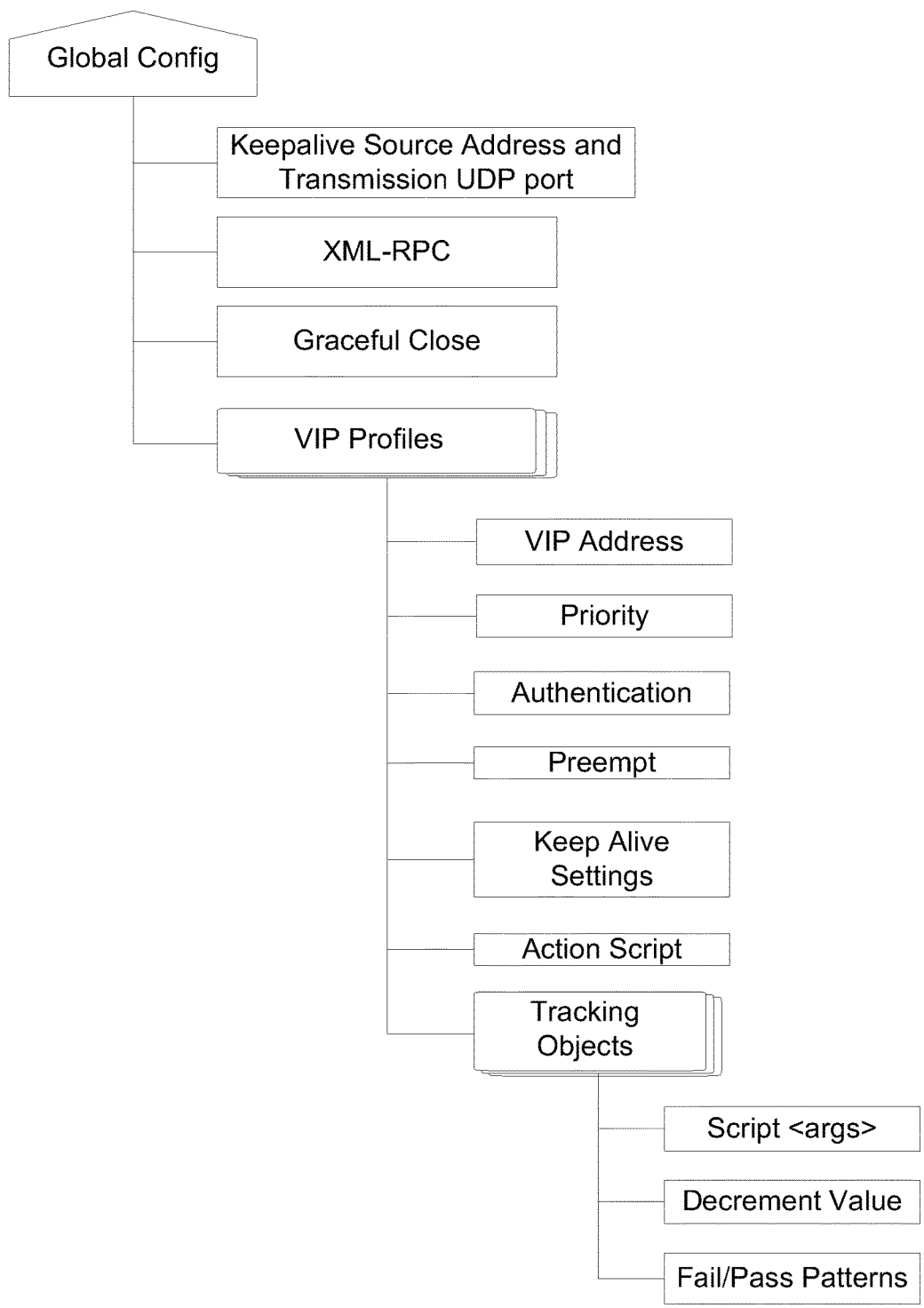
FIG. 10 is a structure of an example configuration file.

Every server may maintain the configuration file that provides various predetermined and user defined values. Users can update the configuration file to modify policy settings and other preferences. An example structure of the configuration file is illustrated in FIG. 10. The configuration file on a given server may contain separate sections for each of the VIP profiles that server participates in. The configuration file stores the information that is included in the keepalive message as well as the destination address and/or port where the keepalive message may be transmitted to. The configuration file may store such information related to each VIP profile a server participates in. The configuration file may also store action scripts and tracking objects that may be executed in response to predetermined time intervals or in response to predetermined events. The configuration file further may also store information used by the graceful close monitor 216. The configuration file may also store remote procedure calls that allow third party applications to interact with the system 100. Such remote procedure calls may be stored in XML format such as XML-RPC, REST/JSON, or SNMP. The configuration file may have additional information that may be used by the system 100. The configuration file may further store settings for the API that third party applications may use to interact with the system 100.

Various embodiments described herein can be used alone or in combination with one another. The foregoing detailed description has described only a few of the many possible implementations of the present disclosure. For this reason, this description of example embodiments is intended by way of illustration, and not by way of limitation.

What is claimed is:

1. A method comprising:
   assigning, at a first server of a high availability server cluster, a virtual internet protocol (VIP) address profile to an application supported by the high availability server cluster;
   determining a first priority associated with the first server of the server cluster and a second priority associated with a second server of the server cluster;
   determining whether the first server successfully executes a tracking object, wherein the tracking object is associated with a value;
   updating the first priority associated with the first server, wherein the first priority is increased by the value associated with the tracking object when the first server successfully executes the tracking object, and wherein the first priority is decreased by the value associated with the tracking object when the first server does not successfully execute the tracking object;
   selecting the first server as an active server for the VIP address profile when the first priority is higher than the second priority; and
   processing client requests for the application directed to the VIP address profile at the first server when the first server is selected as the active server.

2. The method of claim 1, wherein the second server is at least one router hop away from the first server.

3. The method of claim 1, further comprising:
   determining a first neighbor count that indicates a first number of servers from which the first server receives a status message;
   determining a second neighbor count that indicates a second number of servers from which the second server receives the status message; and
   reducing the first priority in response to the first neighbor count not being equal to the second neighbor count.

4. The method of claim 1, further comprising:
   advertising the VIP address, via at least one of a broadcast message to a subnet, a floating static route, or a border gateway protocol, to enable the second server to discover the first server.

5. The method of claim 1, wherein the first priority is determined based on a reachability of the first server that indicates a number of unique network hops visible to the first server and the method further comprises:
   marking the first server as an inactive server in the VIP address profile when the reachability is less than a minimum reachability value; and
   disabling the first server from participation in the VIP address profile by disabling transmission of a periodic status message from the first server.

6. The method of claim 1, wherein the second server is one of a plurality of neighbor servers in the high availability server cluster that are configured to execute the application, and the method further comprises:
   receiving, at the first server incoming periodic status messages from one or more of the plurality of neighbor servers; and
   maintaining a neighbor list, for the first server, of the one or more neighbor servers from which incoming periodic status messages are received.

7. The method of claim 6, wherein the selecting occurs in response to a change to the neighbor list and the first server is selected as the active server for the VIP address profile when the first priority is higher than priorities associated with the one or more neighbor servers included on the neighbor list.

8. The method of claim 6, wherein the maintaining further comprises:
   adding an identity of a particular server of the neighbor servers to the neighbor list in response to initially receiving a particular periodic status message from the particular server at a first time; and
   removing the identity of the particular server from the neighbor list when the particular periodic status message has not been received from the particular server for a predetermined amount of time after the first time.

9. The method of claim 6, wherein the monitoring monitors a predetermined socket address.

10. The method of claim 1, further comprising:
    receiving a first status message from the second server that indicates the second priority; and
    transmitting a second status message to the second server that indicates the first priority.

11. The method of claim 1, further comprising:
    in response to the first priority being equal to the second priority, comparing a first internet protocol (IP) address associated with the first server to a second IP address associated with the second server; and
    selecting the first server as the active server when the first IP address is lower than the second IP address.

12. The method of claim 1, wherein the first priority is determined based on a priority value that indicates a preference for a particular server.

13. The method of claim 1, further comprising:
    informing an upstream router of an internet protocol address of the active server of the VIP profile.

14. An apparatus comprising:
a network interface unit configured to enable network communications; and
a processor coupled to the network interface unit, and configured to:
   assign a virtual internet protocol (VIP) address profile to an application supported by a high availability server cluster;
   determine a first priority associated with a first server of the server cluster and a second priority associated with a second server of the server cluster;
   determine whether the first server successfully executes a tracking object, wherein the tracking object is associated with a value;
   update the first priority associated with the first server, wherein the first priority is increased by the value associated with the tracking object when the first server successfully executes the tracking object, and wherein the first priority is decreased by the value associated with the tracking object when the first server does not successfully execute the tracking object;
   select the first server as an active server for the VIP address profile when the first priority is higher than the second priority; and
   process client requests for the application directed to the VIP address profile at the first server when the first server is selected as the active server.

15. The apparatus of claim 14, wherein the second server is one of a plurality of neighbor servers in the high availability server cluster that are configured to execute the application, and the processor is further configured to:
receive, at the first server incoming periodic status messages from one or more of the plurality of neighbor servers; and
maintain a neighbor list, for the first server, of the one or more neighbor servers from which incoming periodic status messages are received.

16. The apparatus of claim 15, wherein the processor is configured to select in response to a change to the neighbor list and the first server is selected as the active server for the VIP address profile when the first priority is higher than priorities associated with the one or more neighbor servers included on the neighbor list.

17. The apparatus of claim 15, wherein the processor is further configured to:
receive a first status message from the second server that indicates the second priority; and
transmit a second status message to the second server that indicates the first priority.

18. A non-transitory computer-readable storage media encoded with software comprising computer executable instructions and, when the software is executed, the software is operable to:
   assign a virtual internet protocol (VIP) address profile to an application supported by a high availability server cluster;
   determine a first priority associated with a first server of the server cluster and a second priority associated with a second server of the server cluster;
   determine whether the first server successfully executes a tracking object, wherein the tracking object is associated with a value;
   update the first priority associated with the first server, wherein the first priority is increased by the value associated with the tracking object when the first server successfully executes the tracking object, and wherein the first priority is decreased by the value associated with the tracking object when the first server does not successfully execute the tracking object;
   select the first server as an active server for the VIP address profile when the first priority is higher than the second priority; and
   process client requests for the application directed to the VIP address profile at the first server when the first server is selected as the active server.

19. The non-transitory computer-readable storage media of claim 18, wherein the second server is one of a plurality of neighbor servers in the high availability server cluster that are configured to execute the application, and when the software is executed, the software is further operable to:
receive, at the first server incoming periodic status messages from one or more of the plurality of neighbor servers; and
maintain a neighbor list, for the first server, of the one or more neighbor servers from which incoming periodic status messages are received.

20. The non-transitory computer-readable storage media of claim 18, wherein when the software is executed, the software is further operable to:
receive a first status message from the second server that indicates the second priority; and
transmit a second status message to the second server that indicates the first priority.

* * * * *